Patented Aug. 30, 1927.

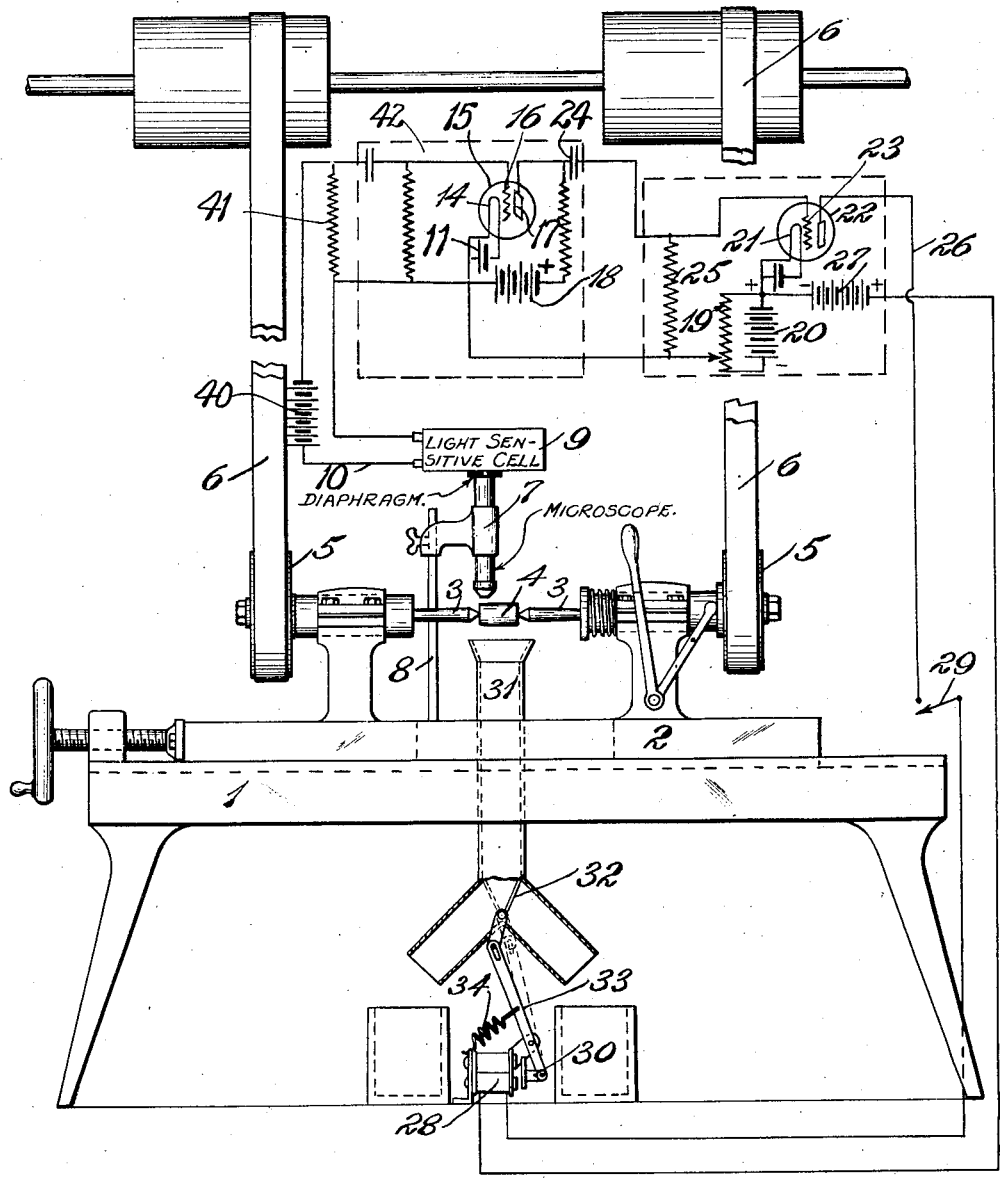

1,640,567

UNITED STATES PATENT OFFICE.

FLOYD FIRESTONE, OF ANN ARBOR, MICHIGAN, ASSIGNOR TO THE REGENTS OF THE UNIVERSITY OF MICHIGAN, OF ANN ARBOR, MICHIGAN, A CORPORATION OF MICHIGAN.

MACHINE FOR DETECTING FLAWS.

Application filed July 20, 1925. Serial No. 44,955.

It is customary at the present time in many lines of manufacture to visually inspect the product for the purpose of detecting flaws therein with a view to separating the imperfect product from the sound, such separation being usually effected manually by the inspector. The value of such inspection depends upon the skill and care of the inspector and, in the aggregate, the cost of such inspections is considerable. The principal object of the present invention is to devise a machine for detecting such flaws and for visibly, audibly or otherwise indicating the same or actually sorting out the defective product. One of the principal objects of the invention is to devise such a machine for the special purpose of inspecting and sorting such products as cups, cones and rollers for roller bearings.

The invention consists principally in an arrangement whereby all portions of the surface of the object to be inspected are brought successively into the focus of a microscope that has associated therewith a light-sensitive cell and indicating or sorting means under the control thereof. It also consists in a sorting machine wherein a light-sensitive cell responsive to the light reflected from or transmitted through the object to be inspected is associated with a suitable amplifier and relay circuit so that an electrical pulse generated in said cell is enabled to shift a sorting device from its normal position, such device then becoming irresponsive to said cell. It also consists in a hook-up of electrical apparatus whereby a pulse from a light-sensitive cell is enabled to effect the operation of a signal or sorter which thereafter remains irresponsive to such cell until reset. It also consists in a hook-up of electrical apparatus whereby a single electrical pulse of slight intensity is enabled to permanently close a normally open relay circuit. The invention also consists in the parts, circuits and combinations hereinafter described and claimed.

The accompanying drawing is a general view of a machine suitable for the inspection of cylindrical rollers for roller bearings, with the electrical circuits and appliances thereof indicated conventionally.

The machine illustrated in the drawing comprises a suitable case 1 having a carriage 2 slidably mounted thereon. This carriage supports suitable centers 3 for rotating the work, such as a roller 4 for a roller bearing. The drawing illustrates such centers as portions of the usual head and tail stocks of the ordinary lathe, both the head and tail stocks having pulleys 5 driven by suitable belts 6 from a suitable source of power. The centers are separable to permit the mounting and removal of the roller 4 or other work; and the carriage itself is arranged to be moved endwise during the operation.

Opposite the work a suitable microscope 7 is supported, preferably on an adjustable support 8 that is mounted on the base frame 1 of the machine so as to remain stationary while the work is carried endwise in front of the microscope by the movement of said carriage. The microscope is so located and adjusted that a small portion of the surface of the work is in the focus thereof. A suitable diaphragm placed in the focal plane of the eye-piece of the microscope limits the field of view to a small portion of such surface, as, for instance, about two millimeters lengthwise of the work by about one one-hundredth of a millimeter circumferentially or crosswise of the work.

Back of the microscope is a photoelectric, selenium, or other light-sensitive cell 9 in an electrical circuit 10 that contains an electric battery 40 and a resistance 41. The input of a vacuum tube amplifier 42 is shunted across resistance 41. The output terminals of the amplifier are shunted by resistance 25 one side of which is connected to potentiometer 19. The other side of resistance 25 is connected to the grid of a gas filled electron tube. The circuit 26 of this electron tube contains an electric battery 27, an electromagnet 28 and a switch or circuit breaker 29 and is connected to the filament circuit 21 of said second vacuum tube. The armature 30 of said electromagnet 28 is adapted to function as a signal or signal controlling device or as a means for actually sorting or classifying the product. For signaling purposes, the electromagnet may be placed at any convenient location; but for actually sorting the articles, it is preferably located in or close to the discharge chute 31 where its armature may serve to guide or deflect the articles into one or another of two branches of said discharge chute. As illustrated, such a deflector 32 is connected by a lever 33 to the armature 30 which is held normally in retracted position by a suitable spring 34.

The machine may be used for small flaws and at the same time attain high speed, for any flaw that remains within the field of view of the microscope for as short a time as a one hundred thousandth part of a second is sufficient to produce a pulse in circuit 10 which can be amplified with the result of closing the circuit of the gate operating magnet, which circuit, as above stated, remains closed until opened by the manually operated switch.

The operation of the foregoing apparatus is as follows:

Assuming that the articles to be tested are, for instance, cylindrical rollers for roller bearings such a roller is mounted on the centers and in axial alinement therewith and the microscope is focused on the surface thereof. Usually such rollers are produced in very large quantities of a given size and no change of adjustment of the microscope is required when one roller is replaced with another. The centers and the roll are now rotated and the sliding table 2 is moved so that all parts of the surface to be inspected are brought successively into the field of view of the microscope. Light is thus reflected from the surface of the roller through the microscope, past the diaphragm, and into the photoelectric or other light-sensitive cell. Due to the well known characteristics of the photoelectric cell, the current in circuit 10 will be proportional to the amount of light falling in the cell. Since this current must flow through resistance 41, it will produce a difference of potential across resistance 41, the amount of this difference of potential depending on the amount of light falling in the cell. If the surface being inspected has no imperfections, the potential difference across resistance 41 will remain constant. If, however, such surface should have a crack, scratch, pit or spot of rust or dark scale, the amount of light reflected into the microscope would be momentarily decreased during the passage of this imperfection across the field of view of the microscope. This would produce a momentary decrease in the potential difference across resistance 41. The sole purpose of amplifier 42 is to magnify the changes of potential across resistance 41 so that the potenial difference changes across resistance 25 are several times as great as those across resistance 41. This amplifier may consist of as many stages as are necessary to secure the proper amplification, and is of conventional type.

The action of tube 22 is as follows: Battery 27 has sufficient electromotive force so that if the grid is held at zero potential the electrons in passing from the filament to the plate will acquire sufficient velocity to ionize the gas in the tube. When this ionization occurs, the space charge is neutralized and the plate current will rise to such a value that that magnet 28 will be able to attract armature 30 against the tension of spring 34. If, however, by means of battery 20 and potentiometer 19, the potential of the grid of tube 22 is maintained at a negative value of some twenty to thirty volts, the electrons in passing from the filament to the plate will not acquire sufficient velocity to ionize the gas in the tube. As this negative grid bias is decreased in value, a critical value is reached at which the electrons in the tube acquire sufficient velocity to ionize the gas and the plate current suddenly jumps to a large value. This ionization and resulting large plate current will now persist, regardless of subsequent changes in the grid potential. In regular operation, this grid potential is regulated by potentiometer 19 to be about five or ten volts more negative than the critical value. If now the grid end of resistance 25 receives a positive potential of more than ten volts from the amplifier the critical value of the grid potential of tube 22 will be crossed and ionization will be started immediately. This will produce a large plate current and operate magnet 28. The current will continue to flow in magnet 28 until switch 29 is opened, at which time the ionization will cease and upon closing switch 29, the circuit is in readiness for the next impulse. To summarize, the action of the entire circuit is as follows:

The passage of an imperfection in the surface being inspected across the field of view of the microscope decreases the illumination of the photoelectric cell, thus producing a fluctuation in the electromotive force across resistance 41. This is amplified and impressed across resistance 25. If of sufficient value, this pulse will produce ionization in tube 22 and an increase in the plate current with consequent operation of magnet 28. These magnets may operate a signal or shutter for separating the perfect from the defective product. After the part inspected has passed through the chute, switch 29 may be manually or automatically opened to restore the circuit to its original condition.

Obviously the construction hereinbefore described is merely a typical embodiment of my invention and I do not wish to be restricted to the details of construction thereof. While I have described a device suitable for inspecting circular rollers, it is obvious that the invention is equally applicable to taper rollers or to other articles with surfaces of revolution, and even to plane surfaces, so long as the surface of the article, or as much thereof as needs inspection, may be moved within the field of view of the microscope, and this condition may be satisfied by numerous well known mechanical movements that form no part of the present invention. The invention is also applicable to the inspection of articles of glass or other transparent or translucent material, with relation to which it will be responsive to blow holes or other flaws that will effect appreciable diminution of the amount of light that enters the microscope.

The hook-up of electrical circuits illustrated in the accompanying drawing is regarded as typical and is subject to variation without departing from my invention. The ionizing tube 22 may be replaced by a glow tube with two electrodes or by a series of lockout relays which will accomplish the operation of magnets 28 and hold them in the operated position until reset. Likewise, while it is preferable to use an ordinary microscope, it is obvious that a different optical system may be substituted therefor. It is also obvious that the illumination of the part to be inspected may be effected by lamp or other source of radiation, that the diaphragm may be omitted, that the vacuum tube amplifier may, in some cases, be omitted, and that in some cases an electric wave filter may be used.

What I claim is:

1. A machine of the kind described comprising an optical system, a light-sensitive cell operatively related to said system to be affected thereby, means for bringing the surface of an article within the field of action of said system in successive small areas, and an electromagnetic device operatively electrically related to said light-sensitive cell to be controlled thereby.

2. A machine of the kind described comprising an optical system, a light-sensitive cell operatively related to said system to be affected thereby, means for bringing the surface of an article within the field of action of said system in successive small areas, and an electromagnetic device operatively electrically related to said light-sensitive cell to be controlled thereby, said device becoming irresponsive to said cell when once actuated.

3. A flaw-detecting machine comprising a microscope, means for bringing the surface of an article into the focus of said microscope in successive small areas, a light-sensitive cell operatively related to said microscope, and an electromagnet operatively electrically related to said light-sensitive cell to be controlled thereby.

4. A flaw-detecting machine comprising a microscope, means for bringing the surface of such an article into the focus of said microscope in successive small areas, a light-sensitive cell operatively related to said microscope, and an electromagnetic device operatively electrically related to said light-sensitive cell to be controlled thereby, said device ceasing to be responsive to said cell when once actuated.

5. A flaw-detecting machine comprising a microscope, means for bringing the surface of an article into the focus of said microscope in successive small areas, a light-sensitive cell operatively related to said microscope, and article sorting means operatively related to said light-sensitive cell to be controlled thereby.

6. A flaw-detecting machine comprising a microscope, means for bringing the surface of such an article into the focus of said microscope in successive small areas, a light-sensitive cell operatively related to said microscope, and article sorting means operatively related to said light-sensitive cell to be controlled thereby, said means becoming irresponsive to said cell when once actuated.

7. A machine for detecting flaws in round articles with light-reflecting surfaces comprising a microscope, a light-sensitive cell operatively related thereto, means for rotating such an article on its axis and moving it endwise in front of the microscope so as to bring the surface to be inspected into the field of view of the microscope in successive small areas, an amplifier operatively related to said cell, and a hook-up of electrical circuits responsive to the output of said amplifier and containing an electromagnet whose armature constitutes a device for directing the sorting of articles undergoing inspection.

8. A machine for detecting flaws in round articles with light-reflecting surfaces comprising a microscope, a light-sensitive cell operatively related thereto, means for rotating such an article on its axle and moving it endwise in front of the microscope so as to bring the surface thereof into the field of view of the microscope in successive small areas, an amplifier operatively related to said cell, and a hook-up of electrical circuits responsive to the output of said amplifier and containing an electromagnet whose armature constitutes a sorting device for articles undergoing inspection.

9. A machine for detecting flaws in articles with bright surfaces of revolution comprising a microscope, means for bringing the surface of said article into the focus of said microscope in successive small areas, a light-sensitive cell in operative relation to said microscope, and a hook-up of electrical circuits, of which the first contains said cell, a source of electrical energy and an amplifier, and the last of which contains a source of electrical energy and an electromagnetic device arranged to respond to a single pulse of electrical energy of sufficient strength generated at said cell.

10. A machine for detecting flaws in articles with bright surfaces of revolution comprising a microscope, means for bringing the surface of said article into the focus of said microscope in successive small areas, a light-sensitive cell in operative relation to said microscope, and a hook-up of electrical circuits, of which the first contains said cell, a source of electrical energy and an amplifier, and the last of which contains a source of electrical energy and an electromagnetic device arranged to respond to a single pulse of electrical energy of sufficient strength generated at said cell, said device becoming irresponsive to said cell when once actuated.

11. A machine for detecting flaws in articles with bright surfaces of revolution comprising a microscope, means for bringing the surface of said article into the focus of said microscope in successive small areas, a light-sensitive cell in operative relation to said microscope, and a hook-up of electrical circuits, of which the first contains said cell, a source of electrical energy and an amplifier, and the last of which contains a source of electrical energy and an electromagnetic device arranged to respond to a single pulse of electrical energy of sufficient strength generated at said cell, said device being arranged to indicate the sorting of such articles.

Signed at Ann Arbor, Michigan, this 14th day of July, 1925.

FLOYD FIRESTONE.